UNITED STATES PATENT OFFICE.

JOHN CORELL, OF NEW YORK, ASSIGNOR OF ONE-HALF HIS RIGHT TO GEORGE W. CLEMINSON, OF BROOKLYN, NEW YORK.

IMPROVEMENT IN SOLUBLE CHOCOLATE.

Specification forming part of Letters Patent No. 138,007, dated April 22, 1873; application filed April 4, 1873.

*To all whom it may concern:*

Be it known that I, JOHN CORELL, of the city, county, and State of New York, have invented a certain new and improved article of manufacture of Soluble Chocolate; and I do hereby declare that the following is a full description of the same.

The object of my invention is to make a perfectly soluble and fragrant chocolate beverage, and at the same time preserve all the constituents of the cacao bean or seed, that the quality of the article may not only be healthful, but at the same time a cheap and agreeable drink.

In chocolates as commonly made, when sweetened with cane or other granulated sugar, or when made without such sweetening, there is always a large sedimentary deposit of insoluble matter, and a floating skim of oily, fatty matter, known as cacao-butter, separated from the watery parts by the operation of boiling. The consequence of this is that chocolates thus made are not only unpalatable, but by reason of the free state of the fatty oil of the cacao-bean are absolutely injurious to dyspeptics, or persons of weak digestive organs, when in fact the chocolate, if properly made to preserve all the albumen, starch, gum, lignine, and fatty buttery matter in a combined state, is one of the most nutritious and easily digestible drinks partaken of. My invention is to attain this result, and consists in combining with the prepared cacao-bean, a menstruum of uncrystallizable sugar, obtained from either potatoes or sago, and known as potato-sugar and sago-sugar, as the case may be from which the article is made.

The preparation of the soluble chocolate is as follows, to wit: I take about one hundred and twenty-five pounds of cacao-bean, and by a slow heat roast them till they become crisp or brittle, and then remove the husk or shell therefrom. When thus prepared, they are put into a suitable mill, heated up to about one hundred degrees, (Fahrenheit grade,) and ground to an impalpable liquid paste. The paste is then transferred to a suitable kettle surrounded by a steam-chamber, and thus, by steam heat, kept in a liquid state. While in this state is added to the mass about one hundred and fifty pounds of potato-sugar or sago-sugar, or other sugar of similar properties, as contradistinguished from cane, or crystallizable sugars of commerce. When thus mixed together the mass is kept thoroughly and continuously agitated or stirred up till the sugar has been completely dissolved, and a perfect union of the ingredients has been effected. It may then be transferred to cans, or other suitable receptacles for holding it, and if for exportation or preservation for a long time is hermetically sealed up.

In using the article, boiling is not required, as it dissolves freely and rapidly by simply pouring boiling water upon it, when it forms with the addition of a little milk a rich and agreeable drink, free from settlings of undrinkable matter, or oily skimmings, as is the case with chocolates ordinarily prepared. This is due to the fact that potato-sugar or sago-sugar, being uncrystallizable, combines readily with cacao-butter, starch, albumen, and mucilage or gum of the cacao-bean, and not requiring a boiling as with ordinary chocolate, but simply the pouring of boiling water on the paste, and therefore does not cause a separation of the elementary parts of it. With chocolate ordinarily made, and sweetened with cane-sugar, no homogeneous body is formed, and when boiled with the addition of water a separation of the oily buttery matter appears on the surface, while the albuminous matter, with the lignine and gums, to a great extent settle to the bottom of the boiler.

Having now described my invention, I will proceed to set forth what I claim and desire to secure by Letters Patent of the United States—

The new article of manufacture of soluble chocolate made in the manner and of the ingredients substantially as hereinbefore set forth.

JOHN CORELL.

Witnesses:
CHARLES L. BARRITT,
CHAS. R. DURHAM.